United States Patent [19]

Schwendeman et al.

[11] Patent Number: 5,010,317

[45] Date of Patent: Apr. 23, 1991

[54] SATELLITE BASED SIMULCAST PAGING SYSTEM

[75] Inventors: Robert J. Schwendeman, Pompano Beach; William J. Kuznicki, Coral Springs, both of Fla.

[73] Assignee: Motorola, Inc., Schaumburg, Ill.

[21] Appl. No.: 444,457

[22] Filed: Nov. 30, 1989

[51] Int. Cl.⁵ .............................................. H04Q 1/30
[52] U.S. Cl. .......................... 340/311.1; 340/825.44; 340/825.46; 455/7; 455/12; 455/13
[58] Field of Search ........... 340/311.1, 825.44, 825.46; 455/7, 12, 13

[56] References Cited

U.S. PATENT DOCUMENTS

| | | |
|---|---|---|
| 4,105,973 | 8/1978 | Arnold et al. |
| 4,381,562 | 4/1983 | Acampora . |
| 4,718,109 | 1/1988 | Breeden et al. ................ 340/825.44 |
| 4,763,129 | 8/1988 | Perrotta ................................. 455/12 |
| 4,872,015 | 10/1989 | Rosen ................................. 342/353 |
| 4,876,737 | 10/1989 | Woodworth et al. ................ 455/12 |
| 4,901,310 | 2/1990 | Ichiyoshi ............................. 370/75 |

Primary Examiner—Donnie L. Crosland
Attorney, Agent, or Firm—Thomas G. Berry

[57] ABSTRACT

A satellite based simulcast paging communication system comprises a plurality of terrestrial stations capable of simulcasting the paging information with at least one satellite for reception by one or more of a plurality of terrestrial receivers (pagers). Also included is at least one control station for determining where and how to deliver the paging information to achieve simulcast transmission.

30 Claims, 11 Drawing Sheets

SATELLITE BASED SIMULCAST PAGING SYSTEM

TECHNICAL FIELD

This invention relates generally to paging communication systems, and more specifically to wide geographic area simulcast paging systems, and is particularly directed toward a satellite based simulcast paging communication system.

BACKGROUND

It is desirable that the receipt of a message by a selective call receiver (e.g., pager) have a high probability of proper reception. Accordingly, to adequately serve large geographic areas, some paging communications systems simulcast (i.e., transmit the same message at substantially the same time) from several transmitters strategically positioned to provide wide-area coverage (such as through out a city). To obtain even greater coverage, one known multi-city paging system employs satellites to transmit paging messages to ground repeaters in approximately eighty cities so that their customers can be paged while travelling in any of the covered cities.

While it would be desirable to communicate paging information directly from the satellites to the paging receivers, this has been heretofore impractical since in-building penetration of the satellite's low power transmissions do not adequately ensure a high probability of reception. Thus, whenever a paging user entered or abided within buildings having a metal superstructure, the probability of receiving a paging message directly from a satellite would be unacceptably low. Accordingly, a need exists for a paging communication system that provides everyone with convenient, reliable and efficient paging service.

SUMMARY OF THE INVENTION

Briefly, according to the invention, a paging communication system comprises one or more terrestrial stations capable of communicating the paging information with at least one satellite, and for communicating the paging information with at least one control station. The satellite(s) of this system are capable of communicating the paging information directly to at least one terrestrial receiver (e.g., pager) and terrestrial station (for simulcast re-transmission). The system further includes at least one control station for determining where and how to deliver the paging information, and for directing the satellite(s) and/or the terrestrial stations to appropriately deliver the paging information.

DESCRIPTION OF THE PREFERRED EMBODIMENT

Fundamentally, the present invention provides a satellite based simulcast paging communication system designed to call (page) individuals having a selective call receiver (pager). According to the invention, a selective call receiver operates to receive paging information simulcast from a satellite network and local terrestrial (ground) station. In this way, a high probability of correct message reception may be obtained when a paging user enters a building.

THE SYSTEM

Figure 1:
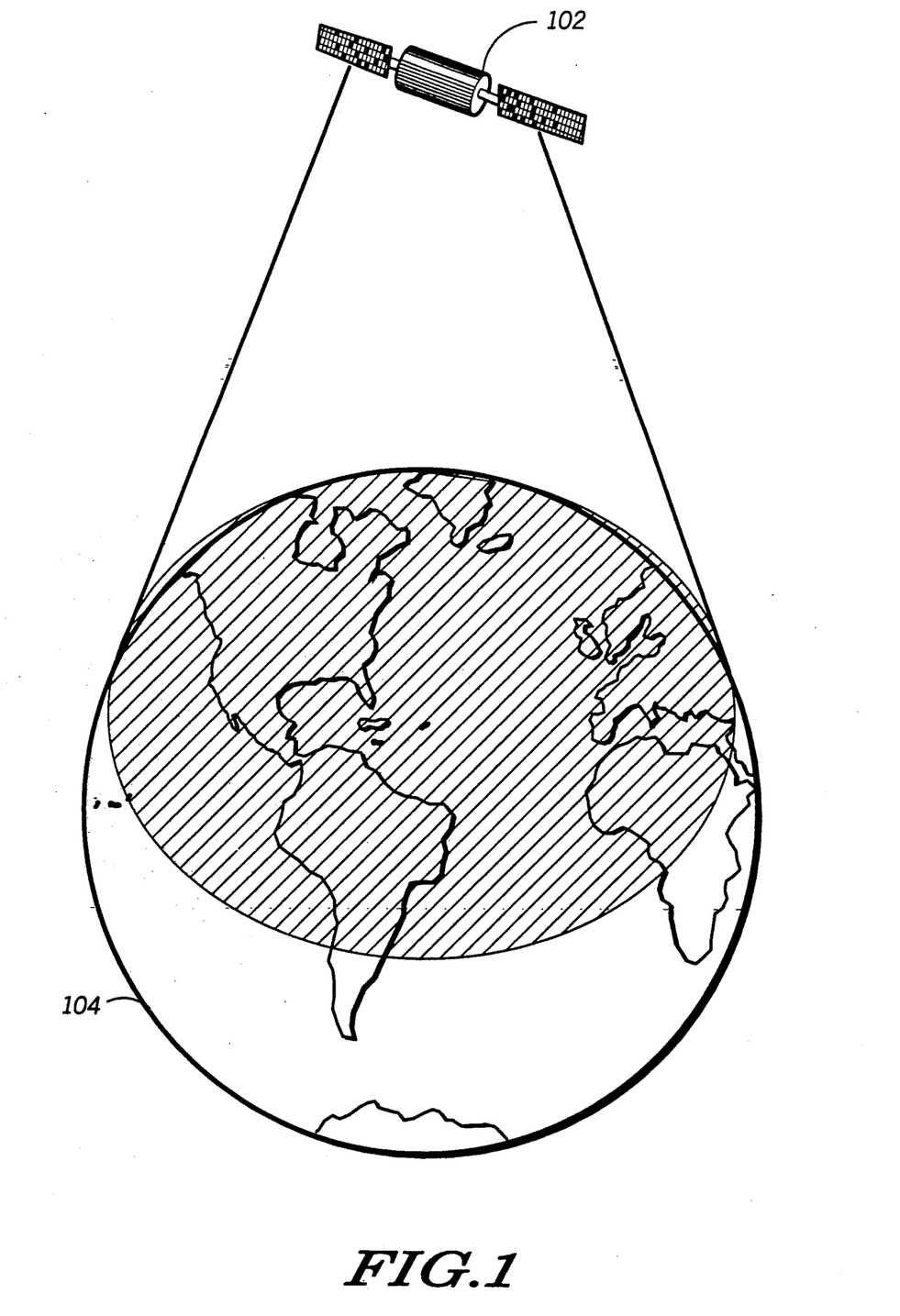
FIG. 1 is an illustration of an orbiting satellite network in accordance with the present invention.

Referring to FIG. 1, the inventive communication system of the present invention can be seen to be based on a satellite network (satellite 102 shown) disposed about a natural or artificial celestial body 104. According to the invention, the satellite 102 is of the geostationary type so as to provide communication regardless of whether the receiver is operating on a land mass, on a body of water, or traveling by aircraft (provided that the aircraft is within the beam of the transmitting satellite). Of course, more satellites could be used depending on the transmission capabilities of the satellites and the desired communication coverage of the planet.

Within the satellite network, each satellite operates substantially independently of the others; although the entire satellite network is coordinated by a centralized control facility. To provide a paging system capable of accommodating the various operational protocols developed for paging receivers and systems, the present invention adapts a portion of itself for each paging event to the receiver (or receivers) designated to receive the paging information. That is, for example, some paging receivers may receive paging information using Golay Sequential Coding (GSC). Other paging receivers may receive information using the well known POCSAG protocol. Thus, the present invention adapts that portion of the system required to communicate with the pagers to be contacted.

Figure 2:
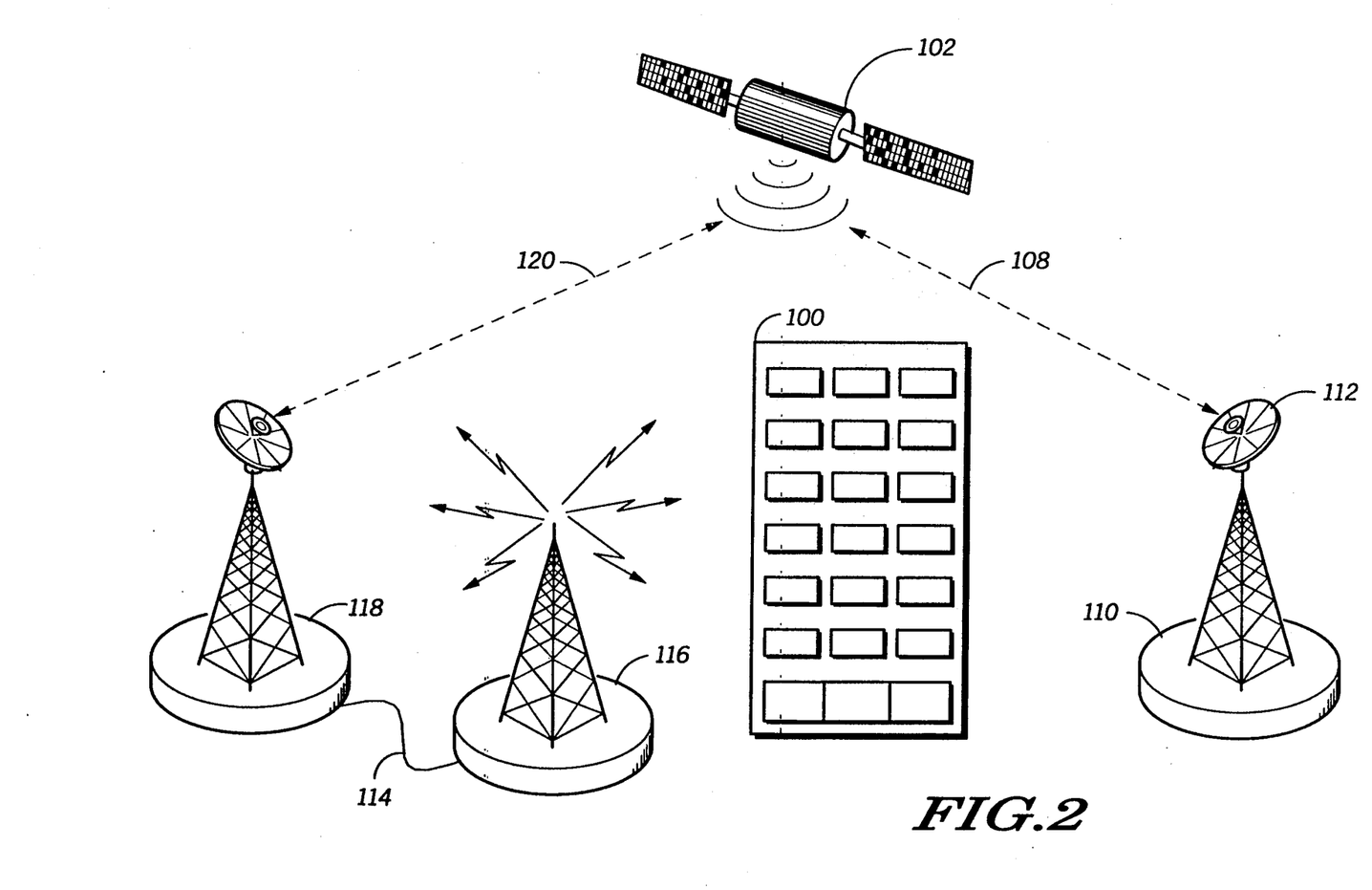
FIG. 2 is a diagram illustrating system operation in accordance with the present invention.

Referring to FIG. 2, a more detailed illustration of a portion of the paging system is shown. As discussed in conjunction with FIG. 1, the present invention employs an orbiting satellite 102 that orbit the planet in a geostationary orbit. A coordinating intelligence for the system is provided by a control station 110, which essentially comprises a large computing center (or other suitable information storage and processing center) that maintains a data library of every paging receiver registered to operate on the global system, together with its preferred location to receive paging messages (if more than one satellite is used), the preferred paging protocol, the required delays to achieve simulcast, and other parameters as may be necessary or desired to provide an effective paging service. In the preferred operation, the control station 110 receives messages from the satellite by an antenna 112, which routes all incoming paging requests from terrestrial stations. Outgoing paging information is provided by the antenna 112 to the satellite network so that the paging information may be directed to the appropriate paging receiver(s). Optionally, more than one control station could be used, however, the maintenance of the data base library could be more difficult. In any event, the paging information is processed by the control station 110 to include information as to where and how the paging message should be delivered (such as selection of the proper paging protocol, transmissions delays, and other such information).

To initiate a page, individuals preferably contact a paging station 116 using telephone-type devices through either a public or private telephone network. The paging station 116 relays (114) the paging message to a terrestrial station 118 for up-link to the satellite network by any appropriate protocol (via transmission path 120). Upon receipt of this information, satellite 102 relays this information to the control station 110 via transmission path 108. Alternately, the paging message could be routed from the terrestrial station 118 to the control station 110 via a ground based communication channel (e.g., telephone link, optic fiber, microwave link).

Upon receipt of a paging request from the satellite network, the control station analyzes the identification (ID) code of the selective call receiver to be paged to determine the paging protocol used by the paging receiver. That is, each individual having a paging receiver operative in the present inventive system is required to define certain parameters necessary to receive paging information. The present invention contemplates that the central station 110 will maintain this information for each selective call receiver registered to operate within the paging system. Accordingly, the control station processes the incoming paging requests and instructs the satellite network where the paging information should be delivered (if more that one satellite is used) and how the paging message should be delivered (e.g., the proper paging protocol, transmission frequency, and required transmission delays to achieve simulcast) by examining the data library to extract information provided by the users of the selective call receiver to be paged. This information is also preferably provided by the paging service provider at the time of registration of a pager on the global system (except the transmissions delay times, which are calculated by the control station using known algorithms). Of course, this information may be updated from time to time if the individual purchases another selective call receiver or is temporarily using a loaned pager during the repair of his or her registered receiver. After determining where and how the paging information should be delivered, the control station 110 returns the paging information to the satellite network via transmission path 108.

For delivery of the paging message, the terrestrial station 116 receives control and paging information from the satellite network and informs the paging site 116 as to the appropriate transmission delay so that simulcast paging transmissions between the satellite 102 and the paging station 116 is effected. These paging events may be executed using the same protocol as the down-link transmission from the satellite, or by translating the down-link protocol into another protocol (i.e., a protocol compatible with the selective call receiver to be paged) so as to be adaptive to the paging receiver that is intended to receive the paging message. In this way pagers may receive the paging messages directly from the satellite 102 or from the local ground station 116. This enables pager residing in a building 100 that may not be capable of receiving paging messages directly from the satellite network to reliably receive the paging information from the terrestrial station. In this way, the terrestrial stations 118 and ground stations 116 may be used in conjunction with the satellite network to provide alternate transmission paths in circumstances where the paging receiver cannot correctly receive the paging information directly from the satellite network.

THE SATELLITE(S)

Figure 3:
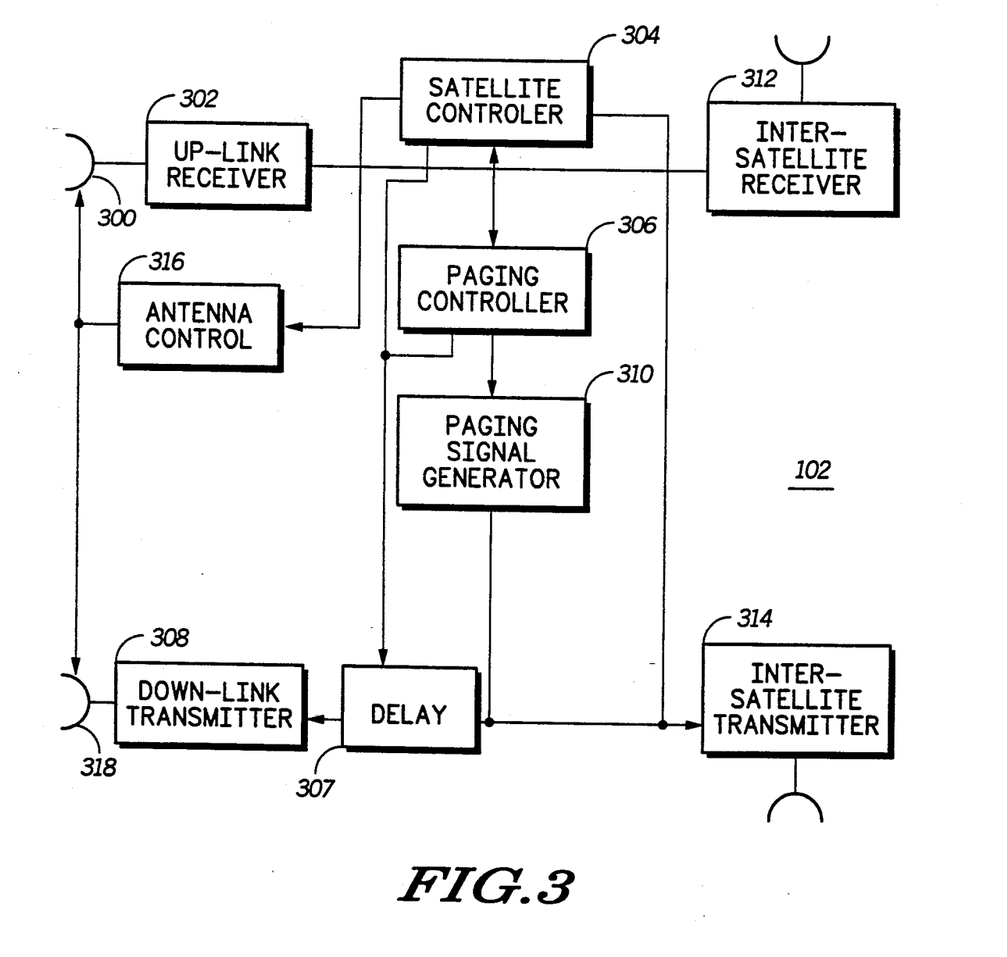
FIG. 3 is a block diagram of a satellite of FIGS. 1 or 2.

Referring to FIG. 3, a satellite 102 is shown in block diagram form. Preferably, each satellite comprises a conventional geostationary satellite such as those commercially available. One or more additional geostationary satellites may be used in the present invention to expand coverage to achieve global communication ability. Each satellite is placed in orbit by a suitable launch vehicle such as via America's Space Shuttle Program. Once in orbit, a conventional solar cell array is opened to provide power to the satellite 102. Following this, the satellites are brought "on-line" using known techniques, such as, for example, by using comtemporary telemetry, tracking, and control (TT&C) protocols to form the satellite network.

Up-link transmission are received by an up-link antenna 300 and decoded by an up-link receiver 302, which may be a single-band or multi-band receiver depending upon the communication throughput need of the communication system. The up-link receiver is coupled to a conventional satellite controller 304 and a paging controller 306 so as to appropriately route satellite control information and decoded paging information. The satellite controller 304 performs conventional satellite control functions such as orbit maintenance, position tracking, antenna control (316) and other appropriate functions as directed by control personnel on the planet. The satellite controller 304 may also communicate with ground stations via the satellite's down-link transmitter 308 (which also may be single-band or multi-band), so as to provide any information requested by ground based control personnel. To do this, the satellite controller 304 programs (305) a delay circuit 307 for an appropriate delay interval, which for satellite status information may be zero delay (i.e., immediate transmission).

As shown in FIG. 3, the payload of the satellite 102 is occupied by the paging controller 306 and a paging signal generator 310. Upon receipt of paging information, the paging controller must extract the transmission delay (if any) before transmitting the paging message toward the planet for simulcast transmission to a selective call receiver. This delay value is programmed (305) into the delay circuit 307 by the paging controller 306 to compensate for transmission delays so that simulcast transmissions with the ground station(s) is achieved. Optionally, transmission delay compensation may be effected at the control station. In this optional embodiment, the programmable delay would reside at the control station, no delay information would have to be transmitted to the satellite(s), and the satellite(s) would preferably immediately transmit the paging information upon receipt thereof.

Usually, no delay is incorporated for transmitting paging requests to the control station or transmitting paging information to terrestrial stations. Additionally, if more than one satellite is used, the receiving satellite must determine whether it must relay the paging information to another satellite in the satellite network. In such cases, an optional inter-satellite receiver 312 and transmitter 314 are coupled to the paging controller 306 so that the paging information can be appropriately routed. Additionally, the satellite controller 304 may use the inter-satellite receiver and transmitter (single-band or multi-band) to communicate network control information as required for the maintenance of the satellite network. Optionally, a single inter-satellite transceiver may be used provided that its has a steerable antenna system to be able to communicate with its neighboring satellites in the satellite network. Also, multiple inter-satellite transceivers could be used provided that the satellites size and weight were not adversely impacted, and so long as it is not cost prohibitive.

The paging controller 306 determines what and how to transmit in large part in response to the type of information received. For example, up-link transmission from a ground station should ordinarily be routed (undelayed) to the control station, while up-link transmissions from the control station usually contain information as to where and how the paging message should be delivered. (Inter-satellite communications can, of course be either paging request or paging information, and the paging controller determines appropriate routing from the satellite's geostationary position (which is monitored by the satellite controller 304) and the destination of the request or information.)

Before transmitting the paging information to the pager, the paging signal generator 310 is used to provide the appropriate paging protocol. That is, the paging signal generator may deliver the paging information using any known paging protocol or any convenient protocol if transmitting to the control station. For each paging transmission, this information is preferably provided by the control station, or defaults to a predetermined protocol.

Figure 4A:
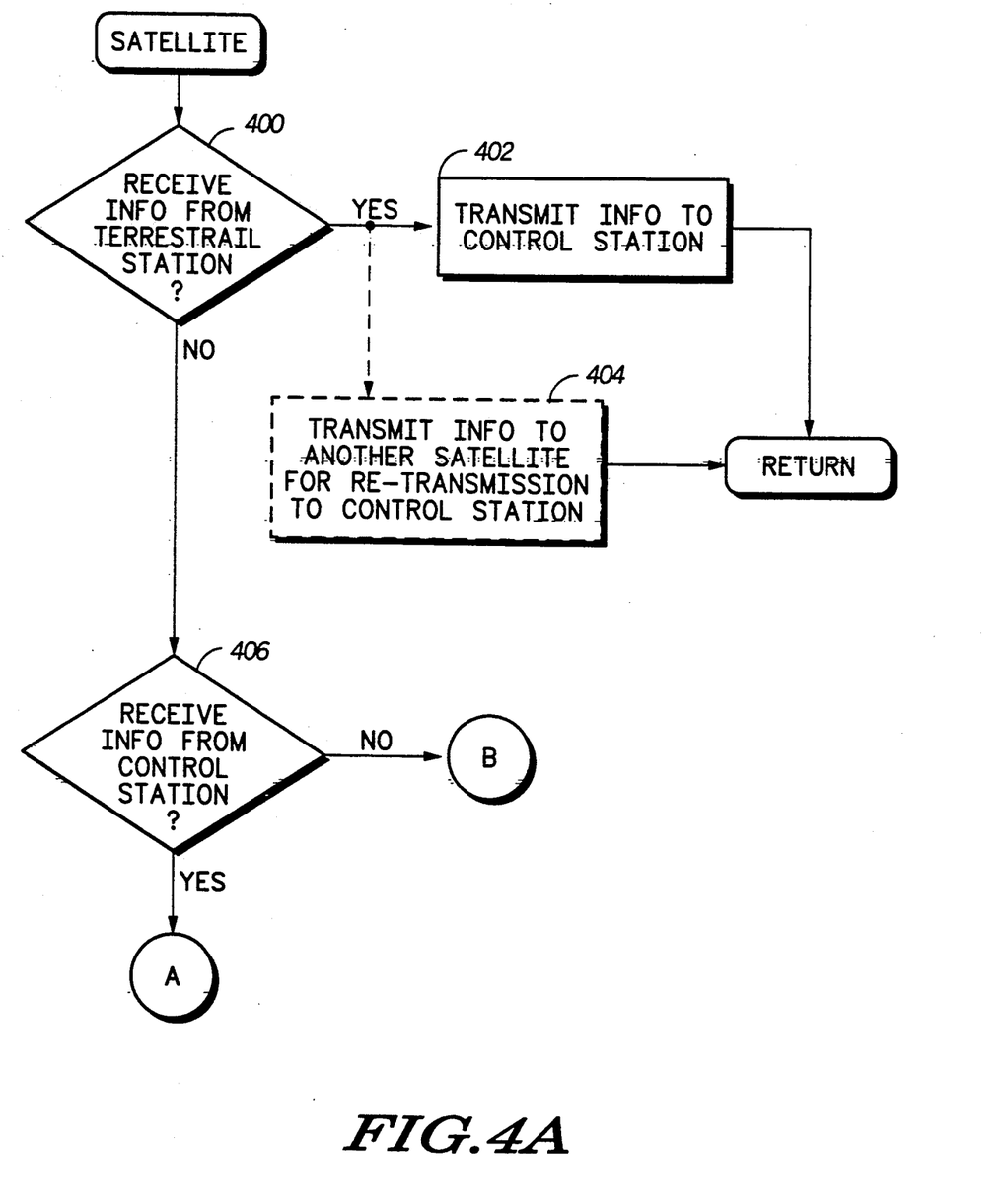
FIGS. 4a-4c are flow diagrams outlining the operation of the satellites of FIGS. 1, or 2.
Figure 4B:
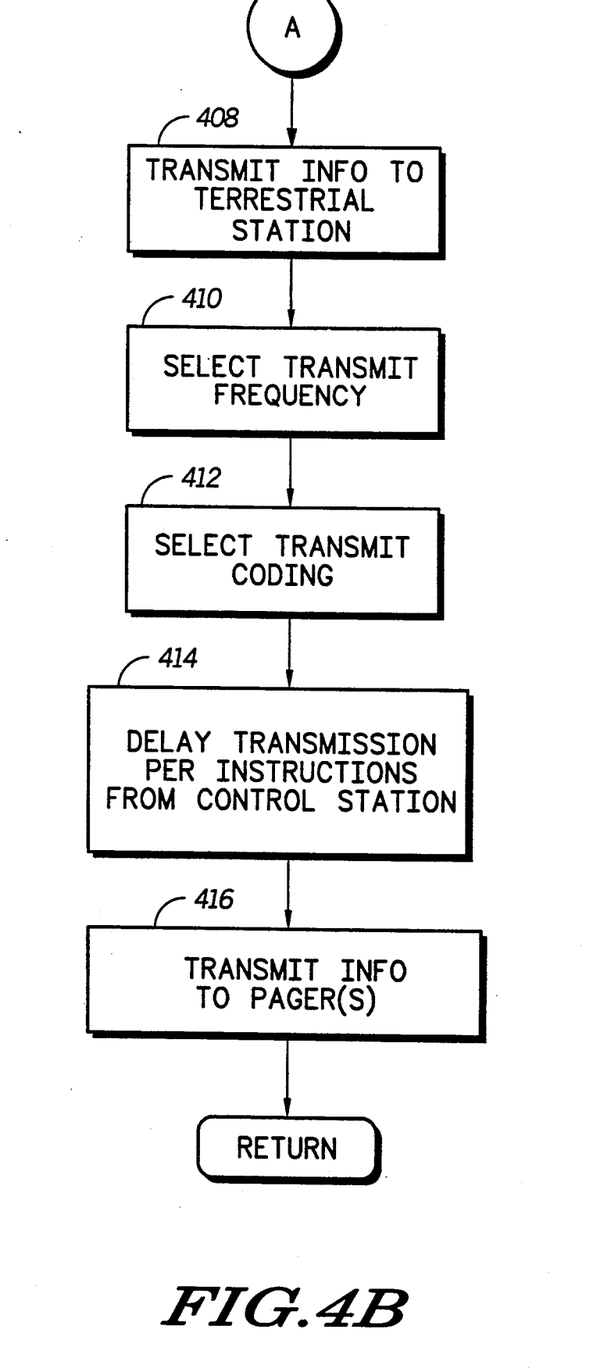
Figure 4C:
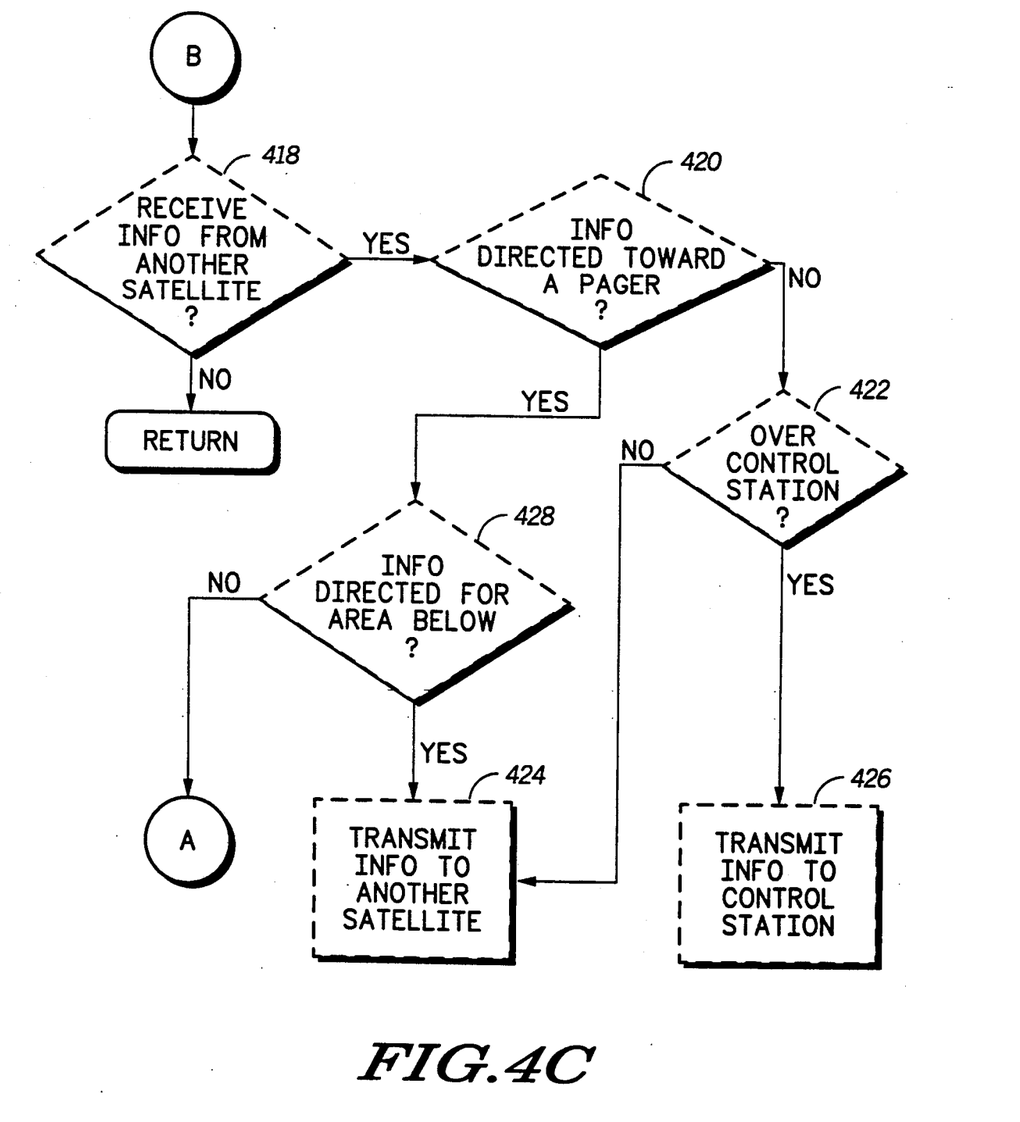

Referring to FIGS. 4a-4c, the preferred operation of the satellites begins with decision 400, which determines whether information has been received from a ground station. An affirmative determination from decision 400 generally means that a paging request has been transmitted from one of the ground stations and should be directed to the control station (step 402) for a determination of where and how the paging message should be delivered. Optionally, if more that one satellite is employed in the satellite network, the information may be transmitted to another satellite for re-transmission to the control station. In this way, the information may progress through the satellite network until it is directed to the control station.

Assuming that the determination of decision 400 is that information was not received from a terrestrial or ground station, the routine proceeds to decision 406, which determines whether information has been received from the control station. According to the invention, the control station processes each paging request and makes determinations as to where and how the paging message should be delivered. Therefore, the control station typically up-links all paging information to the satellite network for appropriate transmissions (and/or distribution through the satellite network) back to the planet (i.e., ground stations and pagers). Thus, should the determination of decision 406 be that the information was received from the control station, the routine proceeds to step 408, where the paging information is transmitted to the terrestrial station. Preferably, this is accomplished without the addition of transmission delays that are necessary used to achieve simulcast. According to the invention, a separate frequency, coding, or address (ID) arrangement may be used so that the terrestrial stations may receive the paging information and prepare to re-broadcast the paging information. That is, the paging information in this first transmission must not be received by the pagers. In this way, the local ground stations can prepare to re-transmit in synchronism with the satellite(s) so as to achieve simulcast.

After sending the paging information to the ground stations, the satellite prepares to transmit the paging information to the pager. First, the appropriate frequency (if different from that used to communicate with the ground stations) is selected (step 410). Next, the transmit code (GSC, POCSAG, etc.) is selected (if different from that used to communicate with the ground station) (step 412). The actual transmission to the pagers will then be delayed an appropriate amount of time (step 414) so that when the information is transmitted (step 416) the pager will receive the paging information in a simulcast environment. This practice ensures a high probability of correct reception by the paging receiver, even if the paging user happens to be in a building (100) when the paging message is received, and also when the pager is in an "overlap" area where the transmissions of both the satellite and the terrestrial station are received by the pager.

Assuming that the determination of 406 is that information was not received from the control station, and if more than one satellite is used in the satellite network, the routine proceeds to decision 418, which determines whether the information was received from another satellite. If so, decision 420 determines whether the information is directed towards a paging receiver. That is, aside from general satellite control and orbit maintenance information, an inter-satellite communication is generally information being directed towards the control station, or information from the control station being directed towards one or more pagers. Thus, a negative determination of decision 420 causes decision 422 to determine whether the satellite is currently over the control station. If not, the information is transmitted to yet another satellite in the satellite network so as to direct the information to the control station (step 424). However, if the satellite is over the control station, step 426 transmits the information to the control station for processing as previously discussed. Conversely, if the determination of decision 420 is that the information is directed towards a pager, decision 428 determines whether the information is directed for the area within its transmission beam. If not, the pager (or pagers) that are to receive this message are not beneath the satellite, and therefore, the paging information must be forwarded to another satellite for delivery (step 424). However, if the determination of decision of 428 is that the information is directed for the geographic area below, the routine proceeds to steps 408–416, where the paging information is transmitted first to the ground station, and then simulcast with the ground station to the paging receiver(s).

THE CONTROL STATION(S)

Figure 5:
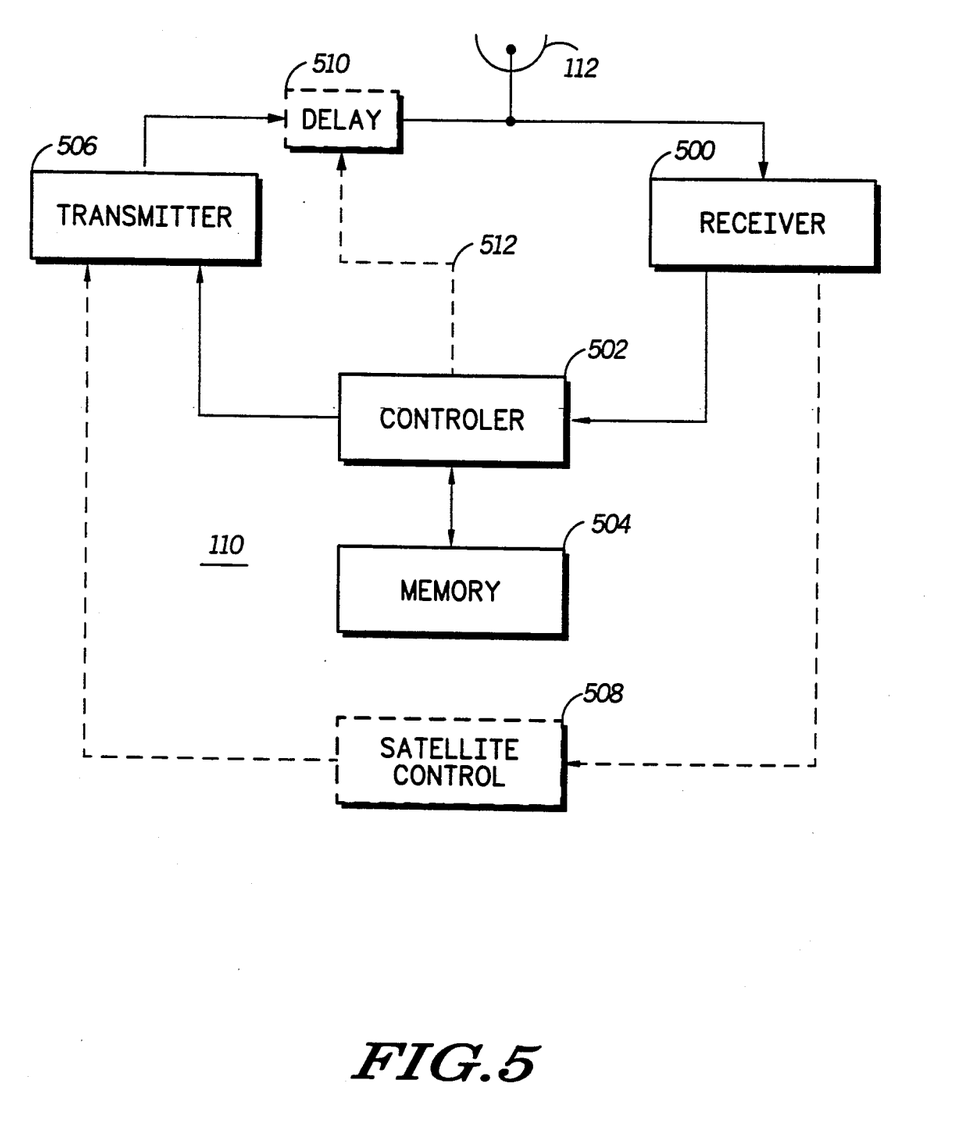
FIG. 5 is a block diagram of the control station of FIG. 2.

Referring to FIG. 5, a block diagram of the control station 110 is shown. The control station 110 receives information from the satellite network via the antenna 112 and a receiver 500. This information is routed to a controller 502, which in one embodiment comprises an MC68030 microcontroller manufactured by Motorola, Inc., or its functional equivalent. The controller 502 operates to process paging requests to determine where and how the paging messages should be delivered. This is accomplished primarily by examination of a data library stored in a memory 504, which contains a suitable amount of type of memory to store operating characteristics and instructions for each receiver registered to operate on the paging system. Additionally, the controller 502 determines the transmission delay times required for the satellite(s) and the ground station(s) to achieve simulcast delivery of the paging information. To do this, conventional algorithms are employed taking into account the satellite's orbit characteristics and other network or transmissions parameters required by the particular algorithm used. After processing this information, the paging message is forwarded to a transmitter 506 for transmission back to the satellite network.

Optionally, the calculated transmission delay may be compensated for at the control station via a programmable (512) delay circuit 510. In this optional embodiment, the delay circuitry in the satellite would not be required, which may reduce the cost and weight of the satellite. Additionally, optional satellite control circuitry 508 may be resident within the control station and each terrestrial station to provide satellite orbit maintenance, position tracking, and other control functions well known in the art for maintenance of the satellite network. Alternately, satellite control maintenance may take place from one or more another facilities designed to track and maintain the satellite network.

Figure 6:
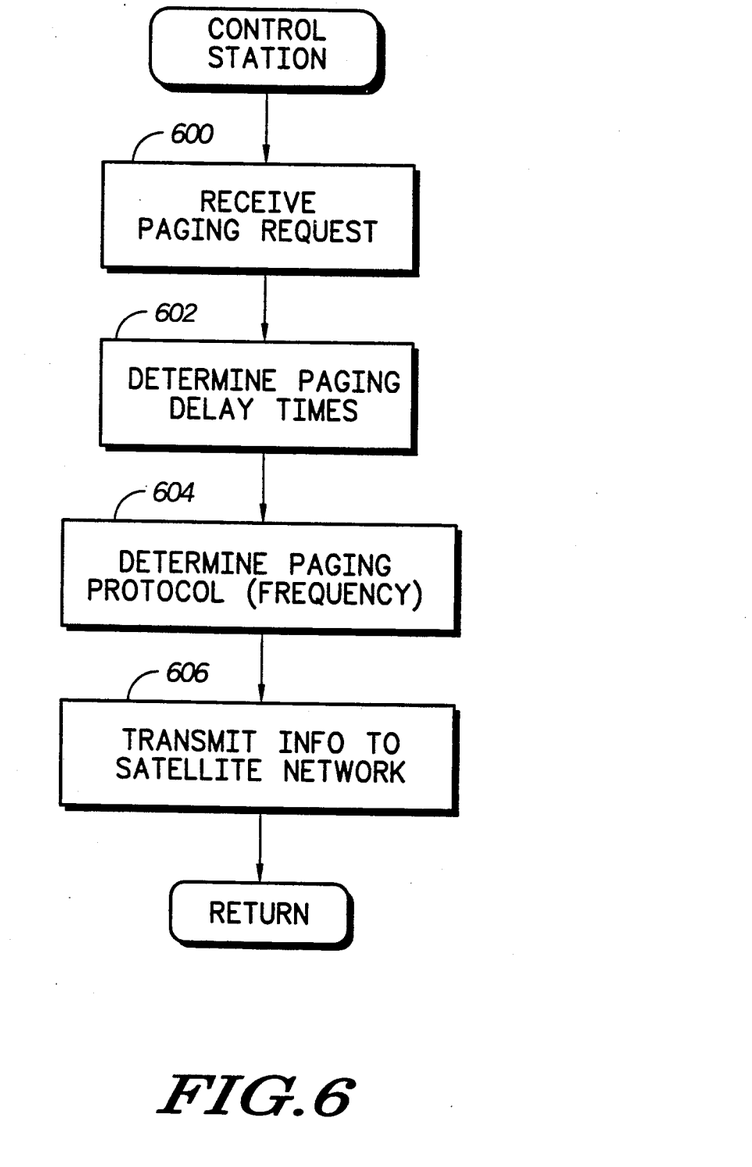
FIG. 6 is a flow diagram illustrating the operation of the control station of FIG. 5.

Referring to FIG. 6, the routine followed by the control station 110 to process a paging request is shown. In step 600, a paging request is received by the control station from the satellite network. In step 602, the control station calculates the delay times for the satellite(s) and the ground station(s) to achieve simulcast transmission. Following this, the controller 502 examines the memory 504 to determine the preferred paging protocol that should be used (step 604). Finally, the control station 110 transmits the paging and control information to the satellite network (step 606). In this way, the paging receiver can receive a paging message simulcast from the satellite and a terrestrial station so that the paging user may receive paging messages even if standing inside a building.

The Ground Station(s)

Figure 7:
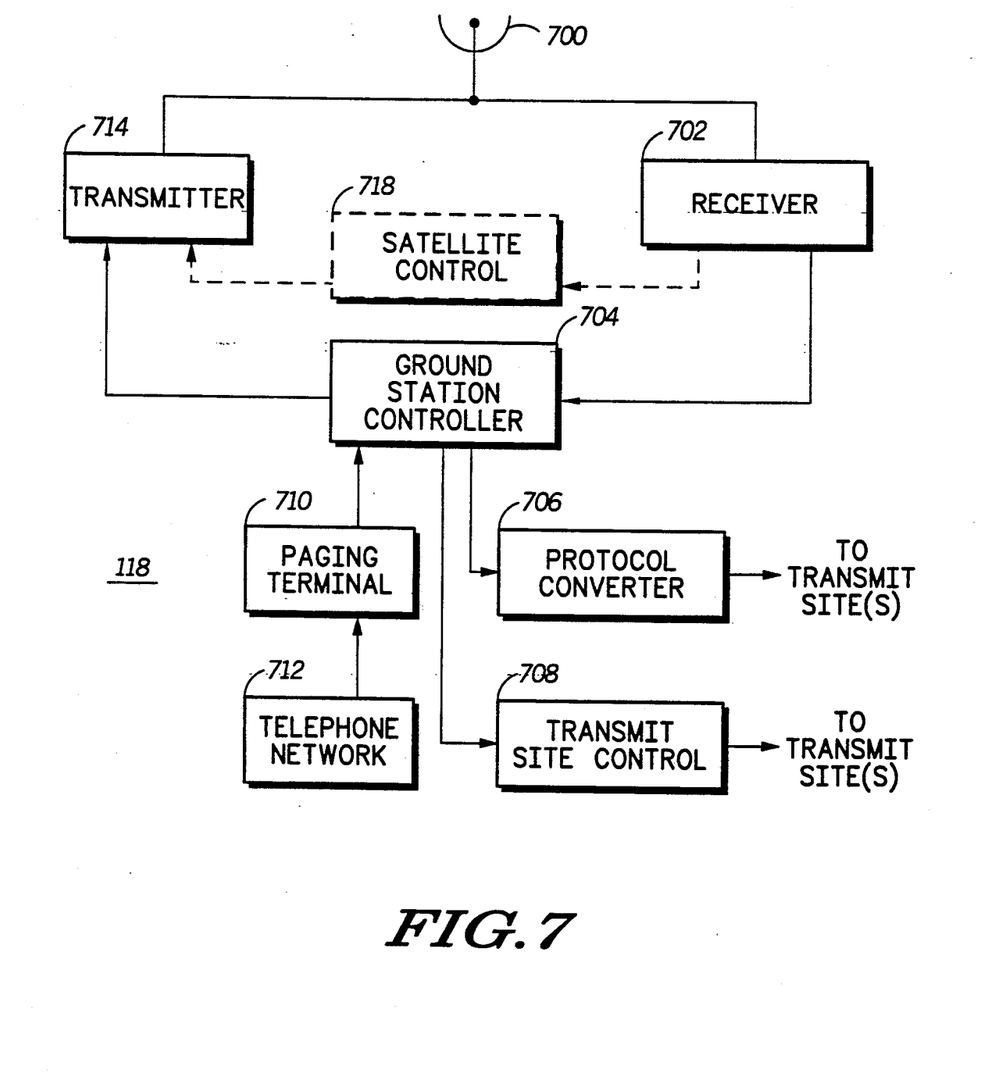
FIG. 7 is a block diagram of a ground station in accordance with the present invention.

Referring to FIG. 7, there is shown a block diagram of a terrestial or ground station 118 in accordance with the present invention. Down-link information from the satellite network is received by an antenna 700 and decoded by a receiver 702 and routed to the ground station controller 704. The ground station controller 704 processes this information to extract instructions from the control station as to the paging frequency, transmission delay time, and paging protocol that should be used in the delivery of the paging message to the paging receiver. The controller 704, in one embodiment, may comprises an MC68030 microcontroller manufactured by Motorola, Inc., or its functional equivalent. In accordance with the instructions from the control station, the ground station controller 704 controls the protocol converter 706 so as to select (or convert) to the appropriate protocol. Fundamentally, the protocol converter 706 operates to decode whatever format was used by the satellite for the down-link message to extract the paging message. Once the message has been extracted, it can be re-encoded in any selected paging protocol for subsequent transmission to the paging receiver. In addition to selecting the appropriate protocol, the ground station controller 704 controls one or more transmit sites controllers 708, which operate to control the local transmit sites (116) in parameters such as frequency selection and transmission delay times.

To generate a paging request, the ground station 118 incorporates a paging terminal 710 to receive messages from public or private telephone networks 712. The paging terminal operates the format and generates the appropriate request, which is forwarded to the ground station controller before being transmitted to the satellite network via a transmitter 714 and antenna 700. Optionally, as discussed in conjunction with the control station, satellite control circuitry 718 may be incorporated into the terrestial or ground stations to provide control and maintenance of the satellite network.

Figure 8:
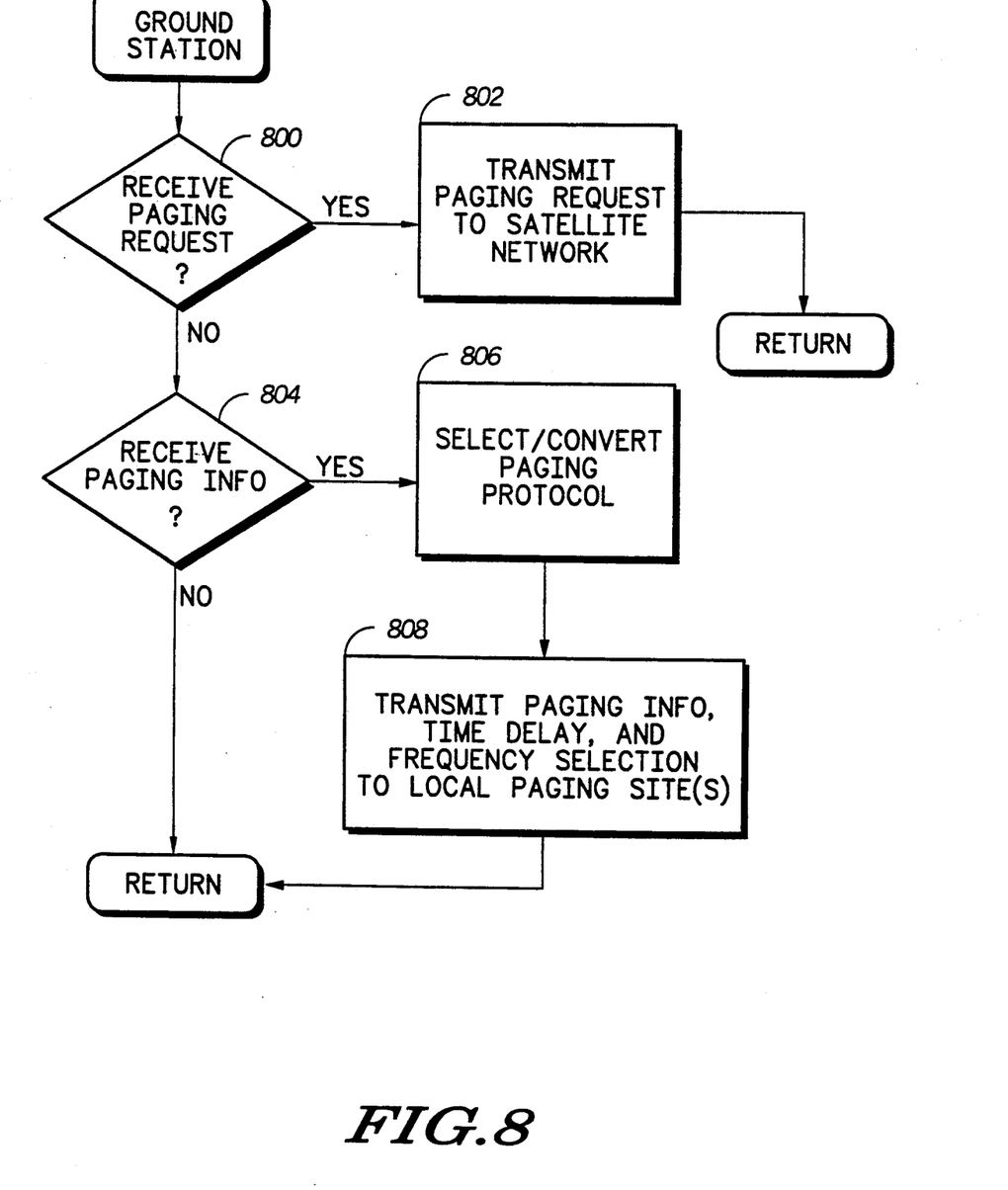
FIG. 8 is a flow diagram illustrating the operation of the ground station of FIG. 7.

Referring to FIG. 8, the preferred sequence of operations of the ground station 118 is illustrated. The routine begins in step 800, which determines whether a paging request has been received. If so, the request is properly formatted and transmitted to the satellite network for routing to the control station as has previously been described (step 802). Conversely, if the determination of decision 800 is that a paging request has not been received the routine proceeds to decision 804, which determines whether paging information has been received from the satellite network. If so, the paging protocol is selected or the down-link protocol is converted to provide the preferred paging protocol required for the paging receiver to be paged (step 806). The routine then proceeds to step 808 for transmission of the (converter) paging information, paging frequency information (if different from the satellite's down-link frequency), and transmission delay times that were extracted from the satellites control information provided by the control station.

The Paging Receiver(s)

Figure 9:
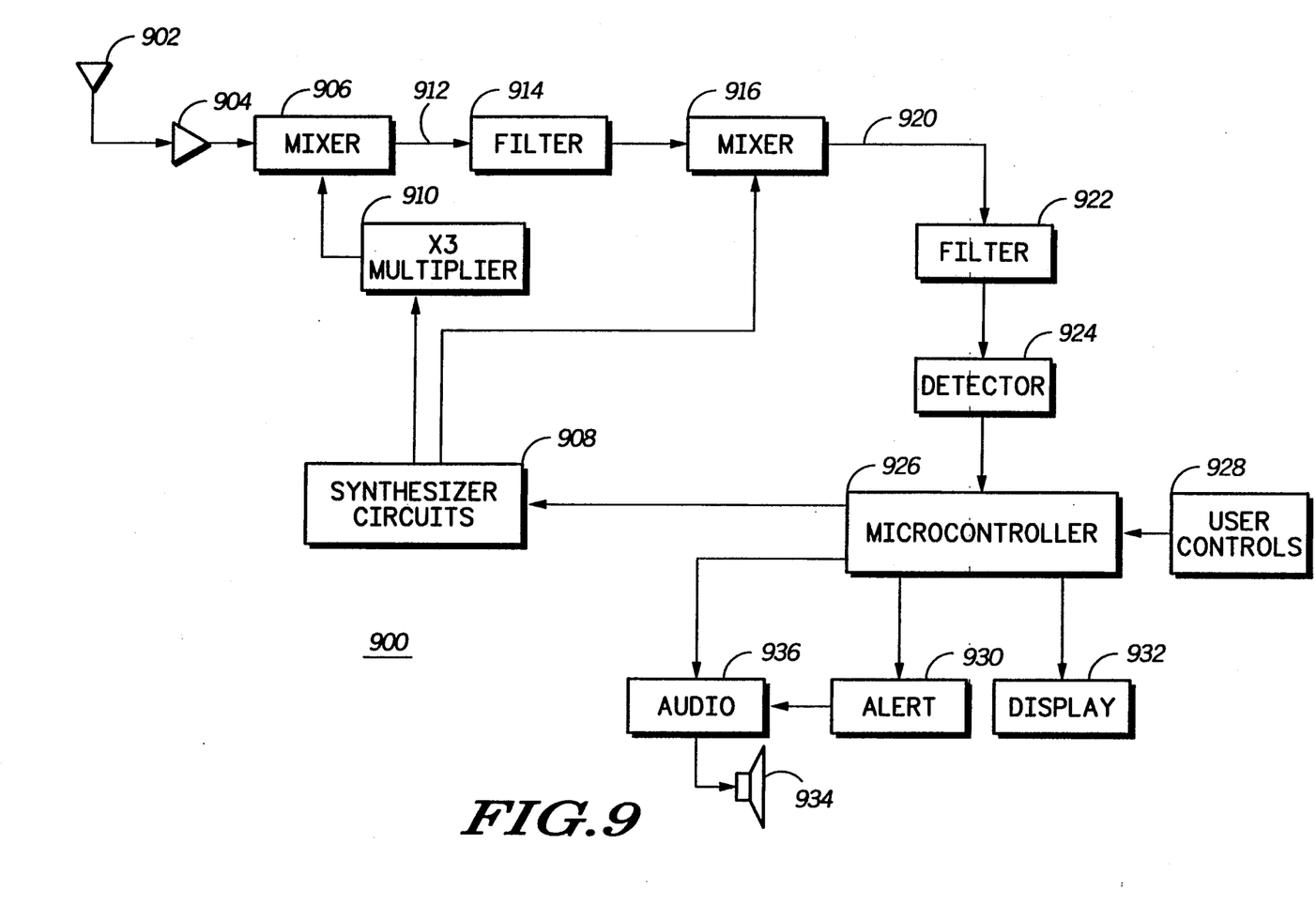
FIG. 9 is a block diagram of a selective call receiver (pager) in accordance with the present invention.

Referring to FIG. 9, there is shown a block diagram of a paging receiver 900 in accordance with the present invention. Operationally, the paging messages are received by an antenna 902, which is forwarded to an RF amplifier 904, which preferably amplifies signals in the 1.5 GHz satellite frequency range. The amplified signals are applied to a mixer 906, which receives a local oscillator signal from synthesizer circuitry 908. To receive satellite based signals, the local oscillator signal is multiplied by a multiplier 910 so as to appropriately demodulate (mix with) the high frequency satellite signal. The mixer 906 provides a first IF signal 912 to an IF filter 914, which is coupled to a second mixer 916. The mixer 916 accepts another local oscillator signal 918 from the synthesizer circuitry 908 and provides a second IF signal 920. The microcontroller 926 controls the synthesizer circuitry 908 so as to appropriately mix these signals down to the first IF signal 912 and the second IF signal 920. Additionally, since the synthesizer circuitry 908 is programmed by the microcontroller 926, the paging receiver 900 of the present invention can operate on several frequencies merely by reprogramming the synthesizer circuitry in any of the known synthesizer programming techniques known in the art.

The second IF is filtered by a second IF filtered 920, and sent on to a detector 924, which decodes and recovers the paging message to presentation to the paging user. To do this, the microcontroller 926 receives instructions and commands from user controls 28, which includes conventional functions such as "read" and "lock" function selections and other known user controls commonly employed on contemporary pagers.

When a message is received, it is customary for the microcontroller 926 to activate an alert circuit 930, which may include silent alert, visual alert, or audible alert as is known in the art. Data messages may be displayed upon any suitable display means 932, while tone, or tone-and-voice messages are presented to the user via a speaker 934 (after amplification and filtering through audio circuits 936). In this way, the paging receiver 900 of the present invention may receive simulcast paging messages from the satellite network and a terrestrial based ground station.

What is claimed is:

1. A simulcast paging communication system, comprising:
    terrestrial based communication means for communicating paging information with a satellite based communication means, the terrestrial based communication means being also capable of simulcasting the paging information with the satellite based communication measn for reception by at least one selective call receiver;
    the satellite based communication means for communicating the paging information with at least a portion of the terrestrial based communication means and for simulcasting the paging information with at least a portion of the terrestrial based communication means for reception by at least one selective call receiver and; and
    a plurality of selective call receivers, for receiving the simulcast paging information from the satellite based communication means and the terrestrial based communication means.

2. The system of claim 1, wherein the satellite based communication means comprises at least one geostationary satellite orbiting a celestial body.

3. The system of claim 1, wherein the satellite based communication means adapts at least a portion of itself to communicate the paging information in accordance with instructions provided by an individual designated to receive the paging information.

4. The system of claim 3, wherein the satellite based communication means adapts at least a paging communication protocol.

5. The system of claim 3, wherein the satellite based communication means adapts at least a paging communication frequency.

6. the system of claim 1, wherein the terrestrial based communication means includes means for converting the paging information received from the satellite based communication means to accommodate the selective call receiver designated to receive the paging information.

7. The system of claim 1, which includes a control means for determining where and how to deliver the paging information.

8. The system of claim 7, wherein the control means includes a memory means for storing at least information representing a preferred paging protocol for at least some of the selective call receivers operative on the system.

9. The system of claim 7, wherein the control means determines where and how to deliver the paging information in accordance with the information stored within the memory means.

10. The system of claim 7, wherein the control means includes delay means for delaying transmission of the paging information.

11. The system of claim 1, wherein the satellite based communication means includes delay means for delaying transmission of the paging information.

12. A simulcast paging communication system, comprising:
    a plurality of terrestrial receivers, at least some of which are capable of receiving paging information simulcast from at least one satellite and one or more terrestrial stations;
    the terrestrial stations being capable of simulcasting the paging information with at least one satellite, and capable of adapting the paging information so as to be compatible with at least one of the plurality of terrestrial receivers; and
    at least one satellite capable of simulcasting the paging information to at least one terrestrial station for reception by at least one of the plurality of terrestrial receivers.

13. The system of claim 12, which includes a plurality of satellites arranged to form a satellite network capable of adapting at least a portion of itself to communicate the paging information in accordance with instructions provided by an individual designated to receive the paging information.

14. The system of claim 13, wherein the satellite network adapts at least a paging communication protocol.

15. The system of claim 13, wherein the satellite network adapts at least a paging communication frequency.

16. The system of claim 12, which includes a control station for determining where and how the paging information should be delivered.

17. The system of claim 16, wherein the control station includes a memory for storing at least information representing a preferred paging frequency for at least some of the plurality of terrestrial receivers operative on the system.

18. The system of claim 16, wherein the control station includes a memory for storing at least information representing a preferred paging protocol for at least some of the plurality of terrestrial receivers operative on the system.

19. The system of claim 16, wherein the control station determines where and how to deliver the paging information in accordance with the information stored within the memory.

20. The system of claim 16, wherein the control means includes delay means for delaying transmission of the paging information.

21. The system of claim 12, wherein the satellite based communication means includes delay means for delaying transmission of the paging information.

22. A method for providing a message to one or more areas on a celestial body, comprising the steps of:
    at any terrestrial station(s):
        (a) receiving the message;
        (b) transmitting the message to a control station;
    at the control station:
        (a) receiving the message;
        (b) transmitting the message to at least one satellite orbiting the celestial body;
    at any satellite(s):
        (a) receiving the message from the control station;
        (b) determining whether to transmit the message toward the celestial body or another satellite;

(c) transmitting the message in accordance with the determination of step (b).

23. The method of claim 22, which includes the control station step of: (a1) determining where and how to deliver the message.

24. The method of claim 23, wherein the control station step of determining where and how to deliver the message comprises the steps of:
  (i) examining a memory means to extract information representing preferred message reception instructions; and
  (ii) forming message delivery instructions based at least in part upon the information representing preferred message reception instructions.

25. The method of claim 24, which includes the step of calculating transmission delay times to achieve simulcast transmission.

26. The method of claim 25, which includes the step of delaying transmission for a time interval corresponding to the calculated transmission delay time.

27. The method of claim 22, wherein the satellite step of transmitting the message comprises transmitting the message to the another satellite when the message is directed toward the control station but the control station is not within the communication abilities of the satellite.

28. The method of claim 22, which includes the step of adapting the message so be compatible with the selective call receiver prior to the transmission thereof.

29. The method of claim 22, wherein step (c) further comprises the step of simulcast transmitting the message with one or more terrestrial stations.

30. The method of claim 22, wherein step (c) includes the step of delaying transmission for a time interval so as to achieve simulcast transmission with one or more terrestrial stations.

* * * * *